United States Patent [19]
Patz et al.

[11] 4,381,733
[45] May 3, 1983

[54] LIVESTOCK FEED CONVEYOR INCLUDING CABLE CLAMP

[75] Inventors: Paul Patz; Howard G. Patz, both of Pound; Russell W. Cleven, Marinette; James M. Hackbarth, Suring, all of Wis.

[73] Assignee: Patz Company, Pound, Wis.

[21] Appl. No.: 327,106

[22] Filed: Dec. 3, 1981

[51] Int. Cl.³ .............................................. A01K 5/02
[52] U.S. Cl. .................................... 119/52 B; 198/364
[58] Field of Search ............. 119/52 B, 52 AF, 56 R; 198/364; 57/217

[56] References Cited
U.S. PATENT DOCUMENTS 3,306,261  2/1967  Purdy ............................... 119/52 B
3,404,526  10/1968  Thomas .............................. 57/217

Primary Examiner—Hugh R. Chamblee

[57] ABSTRACT

Apparatus for depositing cattle feed in an elongated bin in an evenly distributed relation. The apparatus includes a conveyor belt positioned above the feed bin and for supporting feed, a hopper for depositing feed on the supporting surface of the conveyor belt, and a plow adapted to move along the length of the conveyor belt to sweep feed off of the conveyor belt into the bin. The plow is driven by a flexible metal cable reeved over pulleys positioned at opposite ends of the conveyor belt.

18 Claims, 4 Drawing Figures

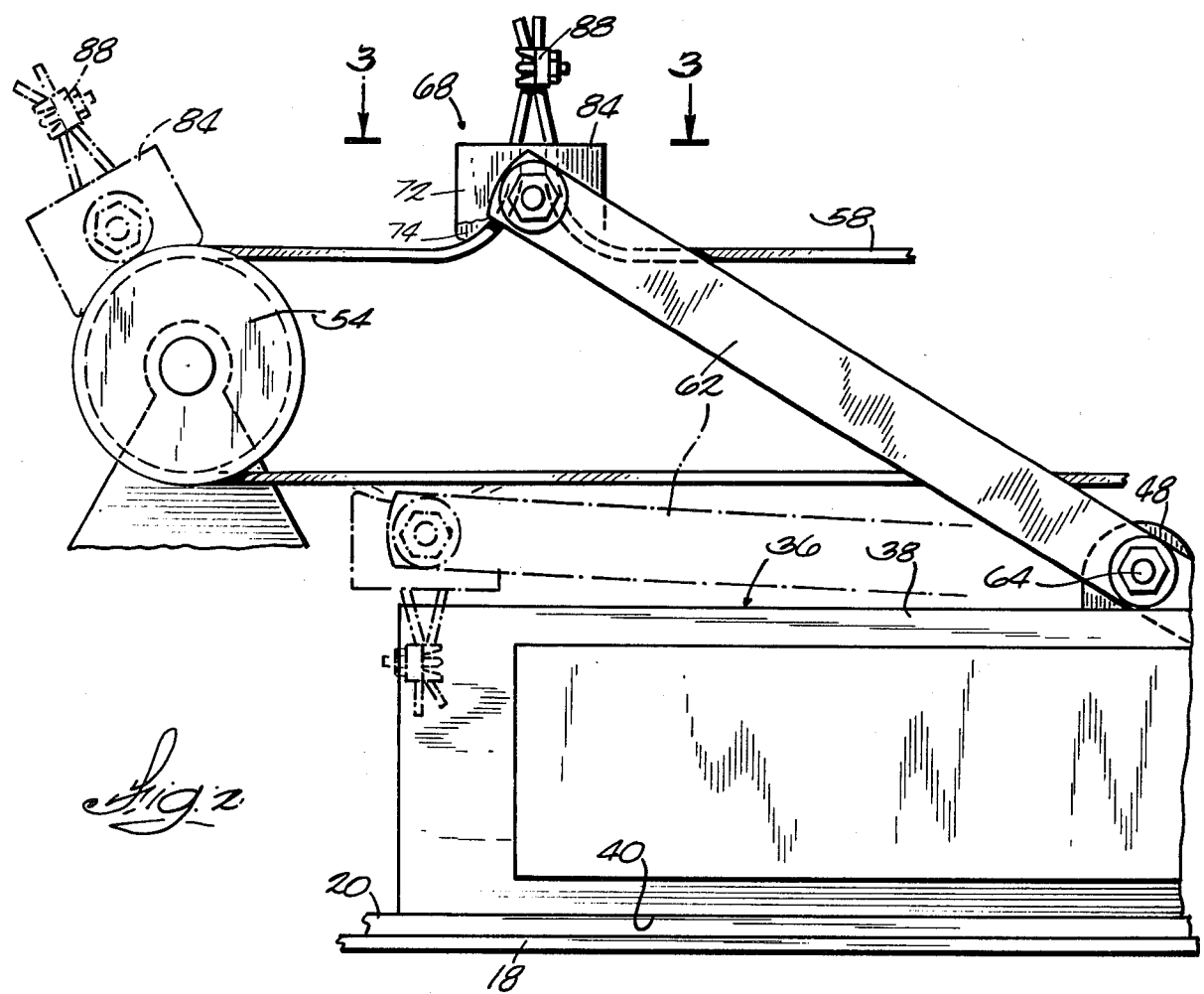
Fig. 2
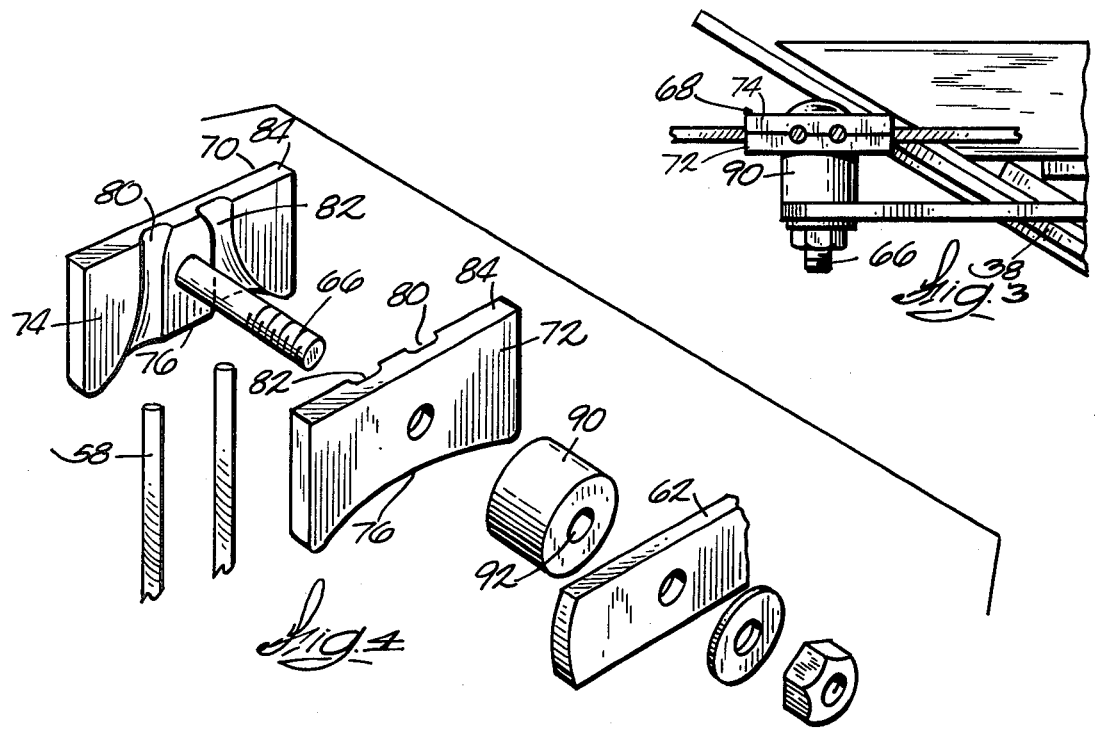
Fig. 3
Fig. 4

LIVESTOCK FEED CONVEYOR INCLUDING CABLE CLAMP

FIELD OF THE INVENTION

The invention relates to livestock feeders or feed conveyors and to such feeders including an elongated conveyor belt adapted to distribute feed along the length of an elongated feed bin.

BACKGROUND OF THE INVENTION

Dairy and beef feed-lots have been automated by employing mechanical means for distributing cattle feed or livestock feed along the length of an elongated feed trough or bunk feeder. Such mechanical means have included a conveyor belt positioned above the bunk feeder with a feed hopper positioned above one end of the conveyor belt. The feed is dropped onto the conveyor belt as the conveyor belt passes beneath the hopper. The conveyor belt moves the feed along the length of the bunk feeder and a plow moves back and forth along the length of the conveyor belt and plows the feed off of the conveyor belt into the bunk feeder below.

An example of one such automatic livestock feeding system is produced by Lancaster Silo Company, Lancaster, Pa.

One of the features of such prior art belt feeders is that the plow is driven along the length of the conveyor belt by a flexible rope. One problem associated with the use of such drive systems is that the length of the feeder is limited since the rope pulling the plow tends to stretch. If the length of the feeder is too long, the rope will sag in the middle and may interfere with the moving plow apparatus.

SUMMARY OF THE INVENTION

The present invention provides a means for driving a plow in a belt feeder wherein the feeder can have a length beyond that which is practical when a rope is used to propel the plow. The invention includes a belt type conveyor wherein the plow is driven by a steel cable impregnated with rubber and having a rubber covering, the steel cable having little elasticity and facilitating the construction of a belt feeder of increased length.

The invention also includes a means for joining the opposite ends of the cable together to facilitate the passage of the joint around the pulleys. The invention also includes an improved means for joining the cable to the plow, this means facilitating use of a means for joining the ends of the cable together which can pass around the pulleys without undue wear of the cable and without repeated flexing of the cable. If a steel cable is caused to flex or bend at a localized point along its length, after repeated flexing or bending, the cable may fail at that point. The means embodied in the present invention for joining the cable ends together has a configuration which reduces the bending of the cable as the joining means pass around the pulleys to thereby increase the working life of the cable.

Various other features and advantages of the invention will be apparent by reference to the following description of a preferred embodiment, from the claims and from the drawings.

BRIEF DESCRIPTION OF THE DRAWINGS

FIG. 2 is a side elevation view of a portion of the apparatus shown in FIG. 1.

FIG. 3 is a cross section view taken along line 3—3 in FIG. 2.

FIG. 4 is an exploded perspective view of the cable clamp assembly illustrated in FIG. 3.

Figure 1:
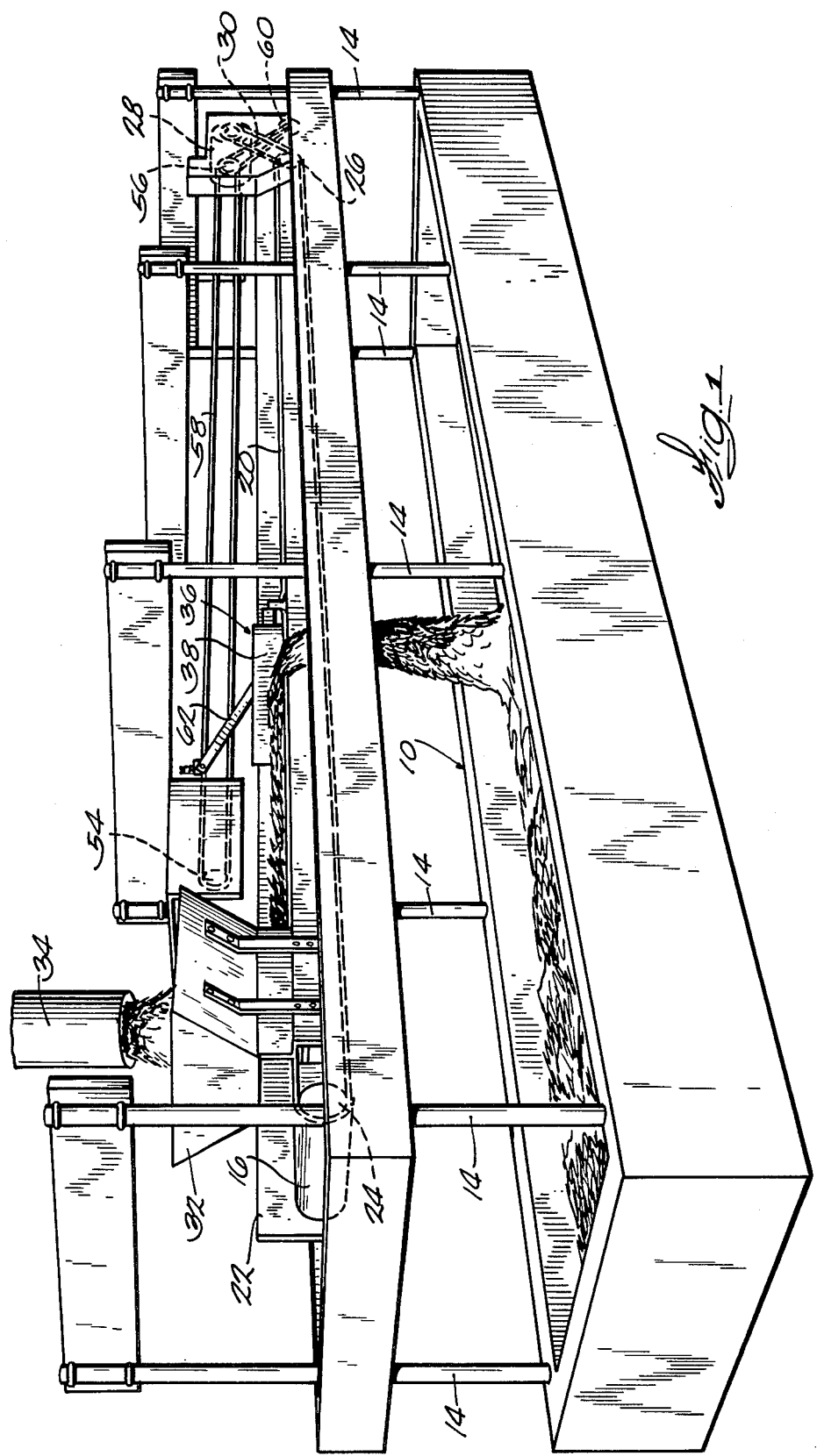
FIG. 1 is a perspective view of apparatus embodying the invention.

Before describing a preferred embodiment of the invention in detail, it is to be understood that the invention is not limited in its application to the details of construction nor to the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF A PREFERRED EMBODIMENT

Illustrated in FIG. 1 is a feeder embodying the present invention and including apparatus for depositing forage and other cattle feed into an elongated feed bin 10 in an evenly distributed pattern along the length of the feed bin. The feeder is supported above the elongated feed bin 10 by a plurality of legs 14 and includes an elongated conveyor belt 16, the conveyor belt 16 being supported above the feed bin 10 and extending along substantially the entire length of the feed bin 10. The feeder also includes an elongated planar horizontal plate 18 (FIG. 2) adapted to support the upper flight 20 of the conveyor belt 16. A vertical side wall 22 extends upwardly from one side of the elongated plate 18 and extends along the entire length of the conveyor. Also included are a pair of drive rollers 24 and 26 supported at opposite ends of the feeder. The upper belt flight 20 of the conveyor belt 16 is supported on the upper planar horizontal surface of the plate 18, extends around and over the drive roller 26, under the elongated plate 18 and under and around the roller 24 at the opposite end of the feeder.

Means are also provided for continuously driving the conveyor belt 16. While various means could be provided for driving the belt, in the illustrated arrangement an electric motor 28 is mounted adjacent one end of the feeder and is drivingly connected by means of a chain and sprocket assembly 30 to the drive roller 26.

Means are further provided for depositing fodder or cattle feed onto the moving conveyor 16, whereby the fodder or feed is carried along the length of the feed bin 10. The means for depositing includes a funnel shaped hopper 32 for containing a quantity of feed which can be supplied by conventional feed handling equipment such as a feed conduit 34. The hopper 32 includes an opening in its bottom for depositing feed onto the moving conveyor belt 16, the feed being fed through the hopper 32 by gravity.

Means are further provided for plowing the feed off of the conveyor belt 16 and into the feed bin 10 and in such a manner as to evenly distribute the feed along the length of the feed bin 10. The means for plowing the feed off of the conveyor belt includes a plow 36 having a blade 38, the plow 36 being adapted to move along the length of the conveyor belt 16 and to push the feed laterally off of the conveyor belt into the feed bin below as shown in FIG. 1. The plow 36 is adapted to move from the hopper 32 and in the direction of movement of the upper belt flight 20 of the belt 16 until the plow reaches the opposite end of the conveyor. During this time the hopper 32 continually deposits feed on the belt as the belt moves beneath the hopper. When the plow reaches the opposite end of the feeder, its direction reverses and it moves along the length of the feeder in the direction opposite to the direction of movement of the upper belt flight 20. The feed conveyor belt 16 moves at a speed approximately 4 or 5 times that of the plow 36 as the plow travels away from the hopper 32, and the plow is positioned such that, as the belt moves beneath the plow blade 38, the plow blade will push the feed off of the conveyor belt into the feed bin 10.

Referring more particularly to the construction of the plow 36, the plow blade 38 defines a vertical plane positioned at an angle of approximately 30° with respect to the direction of movement of the conveyor belt. The plow blade 38 includes a linear lower edge 40 adapted to be positioned against the upper surface of the belt flight 20 such that, as the belt flight 20 moves under the plow blade 38, the blade will force the feed supported on the belt laterally into the feed bin 10.

Means are also provided for causing reciprocating movement of the plow 36 back and forth along the length of the feeder. The means for causing such reciprocating movement of the plow 36 includes a pair of pulleys 54 and 56 positioned at opposite ends of the feeder and an elongated flexible member 58 extending around the pulleys. In a preferred form of the invention, the elongated flexible member 58 is a steel cable comprised of twisted wire impregnated with rubber and having a rubber covering.

Means are also provided for driving the cable 58. While various means could be provided, in the illustrated arrangement the pulley 56 is drivingly connected to the conveyor drive assembly 30 by a belt and pulley arrangement 60. The belt and pulley arrangement 60 is operable to drive the cable 58 at a speed about one-fifth that of the speed of the conveyor belt 16. By providing a rubber impregnated cable 58, the cable surface has a high coefficient of friction and the cable will not slip on the drive pulley 56.

Means are also provided for connecting the drive cable 58 to the plow 36. In the illustrated construction the means for connecting includes a rigid arm 62 pivotably joined to a vertical member 48 of the plow 36. More particularly, a lower end of the rigid arm 62 is pivotally joined to the vertical member 48 by a bolt 64 in such a manner as to permit the arm 62 to be pivotable about a horizontal axis perpendicular to the direction of movement of the plow 36.

The means for connecting the plow 36 to the cable 58 also includes a means for pivotally joining an upper end of the rigid arm 62 to the cable 58, this means for connecting also providing means for joining the opposite ends of the cable together. Referring more particularly to the means for connecting the plow 36 to the cable, the upper end of the rigid arm 62, which is adapted to connect the cable 58 to the plow, includes a bore, and a bolt 66 extends through the bore to pivotably join the upper end of the arm 62 to a cable guide assembly 68.

In operation of the apparatus described above, when the plow 36 is moving away from the hopper 32 and in the direction of movement of the upper flight 20 of the conveyor belt, the frictional engagement of the lower edge 40 of the plow blade 38 with the upper flight 20 of the conveyor belt tends to cause the plow 36 to be pulled along with the conveyor belt. Since the cable 58 is moving at a speed of only one-fifth that of the upper flight 20 of the conveyor belt 16, the cable 58 and the rigid arm 62 restrain the plow 36. When the plow 36 reaches the end of its travel, the cable guide assembly 68 is intended to pass around the circumference of the pulley 56. The cable 58 then pulls the plow 36 in a direction opposite to the direction of movement of the belt flight 20 and toward the pulley 54 as shown in phantom in FIG. 2. When the cable guide assembly 68 reaches pulley 54, it will pass around the circumference of the pulley and once again assume the solid line position shown in FIG. 2.

One of the features of the invention is the provision of a cable guide assembly for joining the ends of the cable 58 together and for attaching the cable 58 to the plow 36 which can move around the pulleys at the opposite ends of the conveyor assembly and which can also support the ends of the cable 58 such that the cable is not damaged or worn as it moves around the pulleys 54 and 56. Referring more particularly to the structure of the cable guide assembly 68, it includes a cable guide means comprised of a pair of opposed identical guide members 70 and 72 adapted to be placed together in face-to-face relation and to house the ends of the cable 58 therebetween. Each of the guide members 70 and 72 includes a face 74 adapted to engage the cable 58 and includes an edge 76 having a concave curve generally complementary to circumference of the pulleys 54 and 56 such that the guide members 70 and 72 can ride an the peripheries of the pulleys. More particularly, the concave surface 76 of the guide members 70 and 72 is provided with a radius of curvature substantially the same as the radius of curvature of the pulleys 54 and 56. While in other embodiments, the guide members 70 and 72 could have other configurations, by constructing the guide members 70 and 72 such that they can rest on the peripheries of the pulleys as they move around pulleys 54 and 56 and with the cable 58 housed in the grooves of the pulleys, the guide assembly 68 will have a smooth continuous motion as it passes around pulleys, and the plow will similiarly have smooth motion as it reverses its direction.

The guide members 70 and 72 also each include a pair of curved grooves 80 and 82 in their respective faces 74, the grooves 80 and 82 being in opposed adjacent relation and each being generally semi-circular in cross section such that, when the guide members 70 and 72 are placed in face-to-face relation, the grooves 80 and 82 of the opposed guide members define passages which are circular in cross-section for housing the ends of the cable 58. The passages defined by the grooves 80 and 82 are large enough that the ends of the cable are loosely supported and flexible therein. The curved grooves 80 and 82 in the faces 74 of each of the guide members 70 and 72 extend from the opposite ends of the edge 76 defining the concave curved surface, toward each other and then curve toward the edge 84 of the guide member opposite the edge 76, the grooves 80 and 82 being relatively closely spaced and parallel as they intersect the edge 84 of the guide member. The portions of the grooves 80 and 82 adjacent the edge 76 of the guide members are adapted to support the ends of the cable 58 such that they extend in opposite directions and are generally colinear. The curve of the grooves 80 and 82 is such that the ends of the cable 58 each curve through a relatively large uniform radius of curvature to a position wherein the ends of the cable 58 are in adjacent side-by-side relation and may be clamped together.

The cable guide assembly 68 also includes means for clamping the ends of the cable together adjacent the edge 84 of the guide members 70 and 72. While various means for clamping could be provided, in the illustrated construction it includes a conventional cable clamp 88 adapted to force the ends of the cable firmly together.

The cable guide assembly 68 also includes means for supporting the guide members 70 and 72 in spaced relation from the end of the arm 62 and for free rotation about the longitudinal axis of the spacer 90. In the illustrated construction that means includes a cylindrical spacer 90 including a central bore 92 housing the bolt 66, the spacer 90 being positioned between the upper end of the arm 62 and the guide member 70, and the guide members 70 and 72 and the bolt 66 being freely rotatable with respect to the upper end of the arm 62. The spacer 90 supports the cable guide assembly 68 in spaced relation from the end of arm 62 such that the end of arm 62 can move past the planar faces of the pulleys 54 and 56 as the cable guide assembly 68 moves around the circumference of the pulley 54.

Various features of the invention are set forth in the following claims.

We claim:

1. Apparatus for depositing cattle feed in an elongated bin in a evenly distributed relation, the apparatus for depositing feed including
    a conveyor belt having a surface for supporting feed,
    means for continuously driving the conveyor belt,
    means for depositing feed on said supporting surface of said conveyor belt,
    a plow including a plow face positioned adjacent said supporting surface and adapted to sweep feed off of said conveyor belt, and
    means for causing reciprocating movement of said plow along the length of said conveyor belt including
    a pair of pulleys, one of said pulleys being supported adjacent one end of said conveyor belt and another of said pulleys being supported adjacent an opposite end of said conveyor belt,
    a flexible metal cable reeved over said pulleys and forming a continuous cable having opposite ends,
    means for driving said cable for continuous movement around said pulleys, and
    means for connecting said cable to said plow, said means for connecting including means for clamping said opposite ends of said cable together and cable guide means adjacent said cable clamp means and for supporting the ends of said cable such that said ends each define a smooth curve.

2. Apparatus as set forth in claim 1 wherein said cable guide means is comprised of a pair of guide members clamped together, said guide members including opposed facing curved grooves adapted to house said cable ends, said cable ends being loosely supported in said grooves so that said cable can flex freely as said cable guide means move around said pulleys.

3. Apparatus as set forth in claim 2 wherein said pulleys each include a circumference having a radius of curvature, said circumference supporting said cable, and wherein said guide members each include a concave curved surface adapted to be positioned adjacent the circumference of said pulleys as said ends of said cable are caused to move around said pulleys.

4. Apparatus as set forth in claim 3 wherein said concave curved surfaces of said guide members have a radius of curvature substantially the same as the radius of curvature of said pulleys.

5. Apparatus as set forth in claim 2 wherein said guide members each define a thin generally planar plate including edges and opposed faces, one of said edges including a surface defining a concave curve adapted to rest on the periphery of said pulleys as said ends of said cable are caused to move around said pulleys.

6. Apparatus as set forth in claim 5 wherein one of said faces of each of said guide members includes a pair of grooves for housing the ends of said cable, said grooves extending from opposite ends of said curved surface toward each other and curving so as to extend transversely to said curved surface and away from said curved surface and so as to be in mutually spaced generally parallel relation.

7. Apparatus as set forth in claim 6 wherein said pair of elongated grooves in one of said guide members are positioned in opposed relation to complementary curved grooves in an opposed guide member and thereby define curved bores for housing said cable ends.

8. Apparatus as set forth in claim 1 wherein said means for connecting said cable to said plow includes a rigid arm having opposite ends, one of said ends being connected to said plow, and means for pivotally connecting said pair of guide members to the opposite end of said rigid arm.

9. Apparatus as set forth in claim 8 wherein said cable guide means is adapted to move around said pulleys with said cables and wherein said means for pivotally connecting includes means for supporting said guide means in spaced relation from said opposite end of said rigid arm.

10. Apparatus for depositing cattle feed in an elongated bin in an evenly distributed relation, the apparatus for depositing feed including
    a conveyor belt having a surface for supporting feed,
    means for continuously driving the conveyor belt,
    means for depositing feed on said supporting surface of said conveyor belt,
    a plow including a plow face positioned adjacent said supporting surface and adapted to sweep feed off of said conveyor belt and
    means for causing reciprocating movement of said plow along the length of said conveyor belt including
    a pair of pulleys, one of said pulleys being supported adjacent one end of said conveyor belt and another of said pulleys being supported adjacent an opposite end of said conveyor belt,
    a flexible metal cable reeved over said pulleys and forming a continuous cable having opposite ends, said cable being impregnated with rubber and including a rubber surface,
    means for driving said cable for continuous movement around said pulleys, and
    means for connecting said cable to said plow including means for clamping the opposite ends of said cable together, and cable guide means adjacent said cable clamping means and for supporting the ends of said cable such that said ends each define a smooth curve.

11. Apparatus as set forth in claim 10 wherein said cable guide means is comprised of a pair of guide members clamped together, said guide members including opposed facing curved grooves adapted to house said cable ends, said cable ends being loosely supported in said grooves so that said cable can flex freely as said cable guide means move around said pulleys.

12. Apparatus as set forth in claim 11 wherein said pulleys each include a circumference having a radius of curvature, said circumference supporting said cable, and wherein said guide members each include a concave curved surface adapted to be positioned adjacent the circumference of said pulleys as said ends of said cable are caused to move around said pulleys.

13. Apparatus as set forth in claim 12 wherein said concave curved surfaces of said guide members have a radius of curvature substantially the same as the radius of curvature of said pulleys.

14. Apparatus as set forth in claim 11 wherein said guide members each define a thin generally planar plate including edges and opposed faces, one of said edges including a surface defining a concave curve adapted to rest on the periphery of said pulleys as said ends of said cable are caused to move around said pulleys.

15. Apparatus as set forth in claim 14 wherein one of said faces of each of said guide members includes a pair of grooves for housing the ends of said cable, said grooves extending from opposite ends of said curved surface toward each other and curving so as to extend transversely to said curved surface and away from said curved surface and so as to be in mutually spaced generally parallel relation.

16. Apparatus as set forth in claim 15 wherein said pair of elongated grooves in one of said guide members are positioned in opposed relation to complementary curved grooves in an opposed guide member and thereby define curved bores for housing said cable ends.

17. Apparatus as set forth in claim 10 wherein said means for connecting said cable to said plow includes a rigid arm having opposite ends, one of said ends being connected to said plow, and means for pivotally connecting said pair of guide members to the opposite end of said rigid arm.

18. Apparatus as set forth in claim 17 wherein said cable guide means is adapted to move around said pulleys with said cables and wherein said means for pivotally connecting includes means for supporting said guide means in spaced relation from said opposite end of said rigid arm.

* * * * *